United States Patent
Nishihara et al.

(10) Patent No.: US 8,602,203 B2
(45) Date of Patent: Dec. 10, 2013

(54) CONVEYING APPARATUS WITH USE OF CONVEYING TRAVELING BODY

(75) Inventors: Shigeyoshi Nishihara, Shiga (JP); Toshiyuki Iba, Shiga (JP)

(73) Assignee: Daifuku Co., Ltd. (JP)

( * ) Notice: Subject to any disclaimer, the term of this patent is extended or adjusted under 35 U.S.C. 154(b) by 161 days.

(21) Appl. No.: 13/196,598

(22) Filed: Aug. 2, 2011

(65) Prior Publication Data

US 2012/0031735 A1   Feb. 9, 2012

(30) Foreign Application Priority Data

Aug. 5, 2010   (JP) ................... 2010-175919

(51) Int. Cl.
*B65G 29/00* (2006.01)
(52) U.S. Cl.
USPC ............... 198/468.11; 198/463.1; 104/172.3
(58) Field of Classification Search
USPC ............ 414/790.3; 198/343.2, 345.2, 463.1, 198/463.3, 465.1, 465.4, 802; 104/171, 104/172.3, 282, 91
See application file for complete search history.

(56) References Cited

U.S. PATENT DOCUMENTS

| | | | | |
|---|---|---|---|---|
| 5,318,167 A | * | 6/1994 | Bronson et al. | 198/577 |
| 5,517,922 A | * | 5/1996 | Summa et al. | 104/172.3 |
| 7,201,102 B1 | * | 4/2007 | Wiedemer et al. | 101/483 |

FOREIGN PATENT DOCUMENTS

JP   2001122422 A   5/2001

* cited by examiner

*Primary Examiner* — Gene Crawford
*Assistant Examiner* — Lester Rushin
(74) *Attorney, Agent, or Firm* — St. Onge Steward Johnston & Reens LLC

(57) ABSTRACT

A driven roller is engageable with a screw shaft and an engaged member is engageable with a pusher of a chain conveyor. The engaged member is projected on the downside of at least one of front and rear trolleys of a conveying traveling body. A conveyed object support base supported via vertical columns of both trolleys includes a driven roller support member composed of an upper column projected downward and aligned in a vertical plane passing through the vertical columns, and a lower arm. The driven roller is pivotally supported by the lower arm at a position higher than a load bar coupling both trolleys.

4 Claims, 7 Drawing Sheets

CONVEYING APPARATUS WITH USE OF CONVEYING TRAVELING BODY

CROSS-REFERENCE TO RELATED APPLICATIONS

The present application claims priority of Japanese patent application No. 2010-175919 filed on Aug. 5, 2010, the content of which is incorporated herein by reference.

FIELD OF THE INVENTION

The present invention relates to a conveying apparatus with use of a conveying traveling body which can be used in both a screw drive section where a screw shaft is supported along a traveling path and a chain drive section where a pusher equipped chain conveyor is stretched along the traveling path.

BACKGROUND OF THE INVENTION

It has been known that this kind of conveying apparatus with use of a conveying traveling body can be achieved by providing the conveying traveling body with both a driven roller which is engaged with the screw shaft and an engaged member which is engaged with a pusher of the pusher equipped chain conveyor, as described in Japanese Published Unexamined Patent Application No. 2001-122422. The conventional conveying apparatus with use of the conveying traveling body of this kind as described in Japanese Published Unexamined Patent Application No. 2001-122422 is configured in such a manner that a wide carriage-type conveying traveling body has a bottom arranged with the afore-mentioned driven roller and engaged member side by side in a lateral left-right direction.

SUMMARY OF THE INVENTION

There has been known a conveying traveling body comprising a load bar which is provided with a joint part having an elongated rod shape in a traveling direction and enabling to make a turn-traveling and which has lateral faces usable as friction drive surfaces, a plurality of trolleys supporting the joint part of the load bar, and vertical columns erected from front and rear two trolleys respectively and having respective upper ends supporting a conveyed object support base. This kind of conveying traveling body can be configured in such a manner that the front and rear two vertical columns move while vertically penetrating a slit opening formed in a floor member so as to make the load bar and the trolleys supporting it travel within an underfloor space and make the conveyed object support base travel within a work space above the floor.

When an attempt is made to provide the conveying traveling body used in the afore-described form with both the driven roller engaged with the screw shaft and the engaged member engaged with the pusher of the pusher equipped chain conveyor, the engaged member which is engaged with the pusher of the pusher equipped chain conveyor can be provided on the downside of the trolley which travels within the underfloor space as described in Japanese Published Unexamined Patent Application No. 2001-122422, but it is not practical to support the driven roller engaged with the screw shaft on a lateral side of the trolley which supports the conveyed object support base since the trolley is significantly small in size as compared with the entire conveyed object support base and also is supported by a pair of left and right guide rails. Further, if the driven roller is attempted to be supported pivotally on the lateral side of the load bar, friction drive of the load bar has to be given up.

Thus, it is conceivable to pivotally support the driven roller on the bottom of the conveyed object support base which travels within the work space above the floor, and at a position lateral to the load bar. However, the driven roller has to be arranged within the underfloor space. Accordingly, a driven roller support member which suspends from the conveyed object support base into the underfloor space is provided, whereupon the driven roller is pivotally supported at the lower end of the driven roller support member. As a result, there arises the need to provide in the floor member a wide slit opening capable of letting through the front and rear two vertical columns which support the conveyed object support base and the driven roller support member or the need to provide a slit opening for letting through the driven roller support member aside from a slit opening for letting through the vertical columns which support the conveyed object support base. However, these slit openings are juxtaposed with a pair of left and right cover materials made of rubber plates which allow the vertical columns and the driven roller support member to pass but can normally close the openings. As a result, not only do floor member installation costs become very expensive as a whole but also circulation of air between the underfloor space and the work space above the floor is activated compared with the case of needing only one narrow slit opening, thereby making it difficult to maintain good atmosphere conditions in the work space above the floor.

Means for Solving the Problems

Accordingly, the present invention proposes a conveying apparatus with use of a conveying traveling body which can solve the afore-described conventional problems. The conveying apparatus with use of a conveying traveling body according to the present invention, described with reference symbols in parentheses used in the description of an embodiment described below in order to facilitate understanding of the relationship with the embodiment, is a conveying apparatus employing a conveying traveling body (1) provided with a driven roller (20a) engaged with a screw shaft (37) supported along a screw drive section of a traveling path and an engaged member (5a) engaged with a pusher of a pusher (47) equipped chain conveyor (38) stretched along a chain drive section of the traveling path. The conveying traveling body (1) comprises at least front and rear two trolleys (5 and 6), a load bar (4) coupling the front and rear two trolleys (5 and 6) together, vertical columns (23a and 23b) supported by the front and rear two trolleys (5 and 6) respectively, and a conveyed object support base (3) supported by the front and rear two vertical columns (23a and 23b). The engaged member (5a) is projected on the downside of at least one of the front and rear two trolleys (5 and 6). The conveyed object support base (3) is provided with a driven roller support member (24a) having an upper column (60) projected downward on a front-back direction center line passing the front and rear two vertical columns (23a and 23b) and a lower arm (61) extending laterally from a lower end of the upper column (60). The driven roller (20a) is pivotally supported by the lower arm (61) of the driven roller support member (24a) and is also positioned higher than a lateral position of the load bar (4).

Effects of the Invention

According to the conveying apparatus with use of the conveying traveling body of the present invention, at the time of driving the conveying traveling body to travel in the screw drive section, the driven roller on the conveyed object support base side of the conveying traveling body is engaged with the spiral part of the screw shaft which is supported along the traveling path and rotationally driven. As a result, the conveying traveling body can be driven to travel at a traveling speed which is determined by a pitch and rotation speed of the spiral part of the screw shaft. At the time of driving this conveying traveling body to travel in the chain drive section, the engaged member on the downside of the trolley of the conveying traveling body is pushed by the pusher of the chain conveyor. As a result, the conveying traveling body can be driven to travel at a moving speed of the pusher of the chain conveyor.

That is, one unit of the conveying traveling body can be driven to travel in both of the screw drive section and the chain drive section. According to the configuration of the present invention, the driven roller for driving the conveying traveling body to travel in the screw drive section is supported to the conveyed object support base side by the driven roller support member. The driven roller support member is arranged on the front-back direction center line which passes the front and rear two vertical columns for supporting the conveyed object support base to the trolleys sides. When the floor member is arranged in such a manner as to vertically separate between a space where the conveyed object support base travels and a space where the trolleys and the load bar move, a single narrow slit opening provided in the floor member in order to let through the front and rear two vertical columns can be used as is to let through the driven roller support member. Not only can floor member installation costs be lowered as compared with the case where a slit opening dedicated to the driven roller support member is additionally provided or where a wide slit opening is provided, but also a good atmosphere environment of the space above the floor can be maintained as easily as before.

Moreover, the driven roller is arranged at a position higher than the load bar which couples the trolleys, so that lateral surfaces of the load bar can be used as friction drive surfaces and friction drive becomes available in a drive section where the driven roller is not driven by the screw shaft. In other words, the friction drive section where the friction drive means with use of the lateral surfaces of the load bar is employed as well as the screw drive section where the screw shaft is used and the chain drive section where the engaged member on the downside of the trolley is pushed by the pusher of the chain conveyor can be incorporated in the conveying apparatus of the present invention.

On the other hand, the driven roller support member can be formed into an L shape by continuously arranging an arm from the lower end of the upper column thereof in a horizontal lateral direction, and the driven roller can be pivotally supported on the downside of a distal end of the arm by a vertical spindle and then engaged with the spiral part at the position directly above the axial center of the screw shaft. In this case, however, a left-right direction clearance from the front-back direction center line where the trolleys of the conveying traveling body are positioned to the engagement position between the driven roller and the screw shaft becomes long. As a result, a lateral left-right direction component of force acted upon the conveying traveling body at the time of being driven to travel by the screw shaft is increased, which leads to obstructing smooth drive and travel.

However, if such a configuration is employed that the lower arm (61) of the driven roller support member (24a) is inclined obliquely downward from the upper column (60) and the driven roller (20a) is pivotally supported while inclined in such a manner that the axial center thereof becomes parallel to the oblique downward direction of the lower arm (61), the engagement position between the driven roller and the screw shaft can be displaced to the side closer to the front-back direction center line where the trolleys of the conveying traveling body are positioned than the position directly above the axial center of the screw shaft. As a result, the left-right direction clearance from the center line to the engagement position between the driven roller and the screw shaft becomes shorter, thereupon reducing the lateral left-right direction component of force acted upon the conveying traveling body at the time of being driven to travel by the screw shaft and also facilitating the realization of smooth drive and travel. Further, the position of the screw shaft can be rendered higher than the case where the arm of the driven roller support member is positioned at the position directly above the screw shaft. Thus, the arrangement of the screw shaft within laterally restricted spaces of narrow moving spaces of the trolleys and the load bar is facilitated.

In addition, only one driven roller engaged with the spiral part of the screw shaft to the conveying traveling body is required. However, the driven roller support member (24a or 24b) in which the driven roller (20a or 20b) is pivotally supported by the lower arm (61) is provided in a front and rear pair on the front-rear direction center line passing the front and rear two vertical columns (23a and 23b), whereby the conveying traveling body can roll on and off easily in the section without screws between the screw shafts as conventionally known in the screw driving type conveying apparatus.

Further, as already described, the front and rear two vertical columns (23a and 23b) and the upper column (60) of the driven roller support member (24a) are preferably configured to move while vertically penetrating one slit opening (58) provided in the floor member (57) installed in such a manner as to vertically separate between a space where the conveyed object support base (3) travels and a space where the trolleys (5 and 6) and the load bar (4) move.

DETAILED DESCRIPTION OF THE INVENTION

Figure 1:
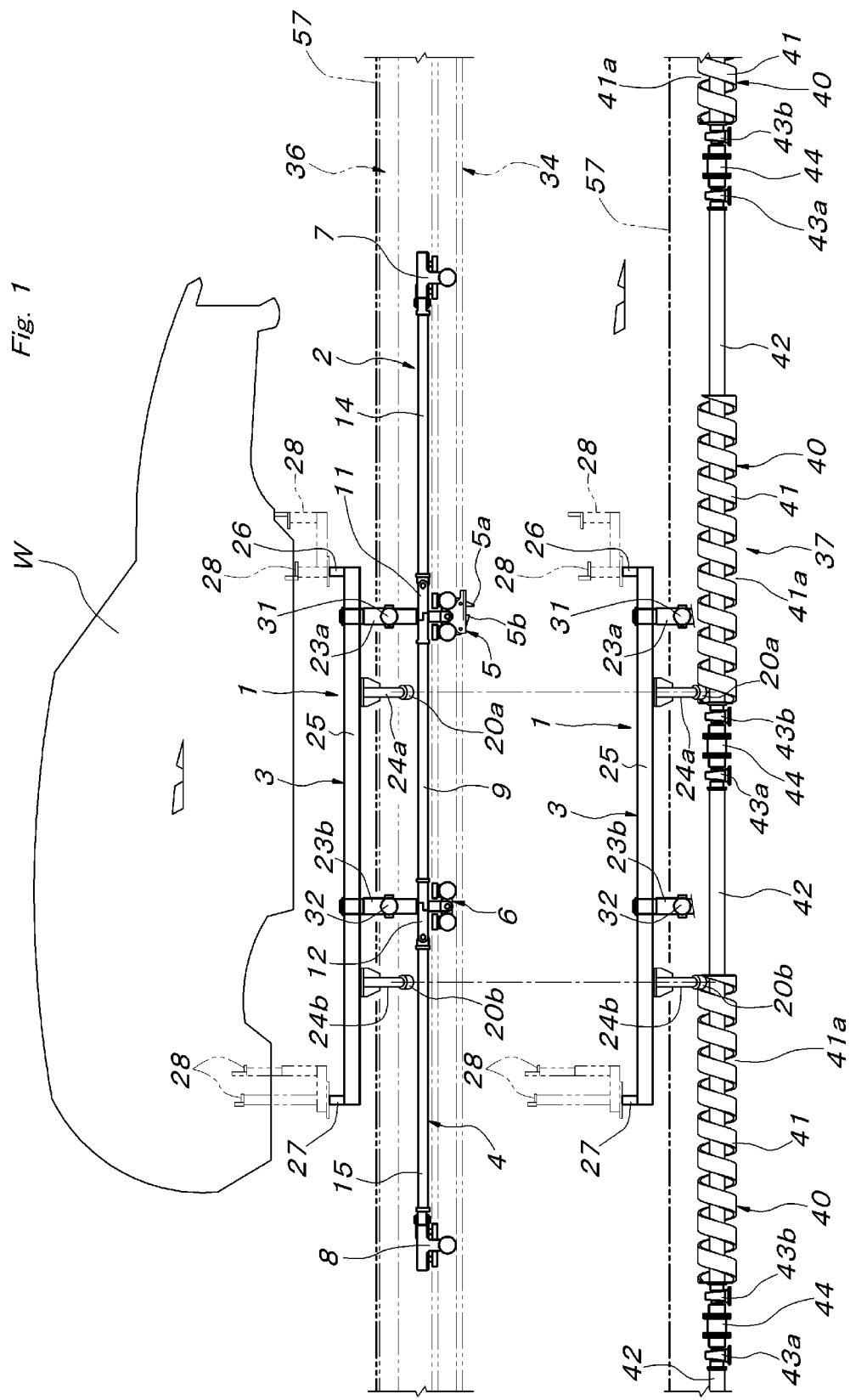
FIG. 1 is a side view of an entire conveying apparatus in a screw drive section.

In FIGS. 1 to 4, reference symbol 1 denotes a conveying traveling body which is composed of a main body 2 and a conveyed object support base 3 supported by the main body 2. The main body 2 of the conveying traveling body 1 is constituted by a load bar 4 long in a traveling direction, load trolleys 5 and 6 supporting two places, the front and rear of the middle of the load bar 4, and guide trolleys 7 and 8 provided at both front and rear ends of the load bar 4. The load bar 4 is constituted by a load bar unit 9 between the load trolleys 5 and 6, joint members 11 and 12 coupled to both ends of the load bar unit 9 so as to be horizontally swingable about vertical spindles 10a and 10b, load bar units 14 and 15 coupled to the joint members 11 and 12 so as to be vertically swingable about horizontal spindles 13a and 13b, and the guide trolleys 7 and 8 coupled to the load bar units 14 and 15 so as to be horizontally swingable about vertical spindles 16a and 16b. Left and right both lateral surfaces of the load bar 4 form flat friction drive surfaces 4a and 4b continuing across an entire length between the guide trolleys 7 and 8 at both distal ends.

The load trolleys 5 and 6 are attached at lower ends of the vertical spindles 10a and 10b located at two places, the front and rear of the middle of the load bar 4 so as to be swingable about horizontal left-right spindles 17a and 17b. The load trolleys 5 and 6 each include front and rear two pairs of left and right supporting wheels 18 pivotally supported by horizontal left-right spindles and a pair of front and rear anti-sway rollers 19 supported by vertical spindles. The guide trolleys 7 and 8 at both ends of the load bar 4 each include a pair of left and right supporting wheels 21 pivotally supported by horizontal left-right spindles and a pair of front and rear anti-sway rollers 22 pivotally supported by vertical spindles.

The conveyed object support base 3 is composed of a pair of front and rear column members 23a and 23b supported to the paired front and rear load trolleys 5 and 6 via the vertical spindles 10a and 10b at the front and rear of the middle of the load bar 4, a longitudinal member 25 supported on both column members 23a and 23b and being parallel to the traveling direction, and a pair of front and rear lateral left-right transverse members 26 and 27 supported at both front and rear ends of the longitudinal member 25 in a T shape. Supporting jigs 28 to support an object to be conveyed (an automobile vehicle body) W are attached on the transverse members 26 and 27. Further, arm members 29 and 30 horizontally projecting toward both lateral sides are provided at intermediate heights of the paired front and rear column members 23a and 23b. Anti-sway guide rollers 31 and 32 are pivotally supported at both lateral ends of the arm members 29 and 30 by horizontal left-right spindles. The conveyed object support base 3 thus configured is provided with driven roller support members 24a and 24b projecting downward from the longitudinal member 25 at respective rearward positions of the paired front and rear column members 23a and 23b. Both driven roller support members 24a and 24b have respective lower ends at which driven rollers 20a and 20b are pivotally supported.

Figure 3:
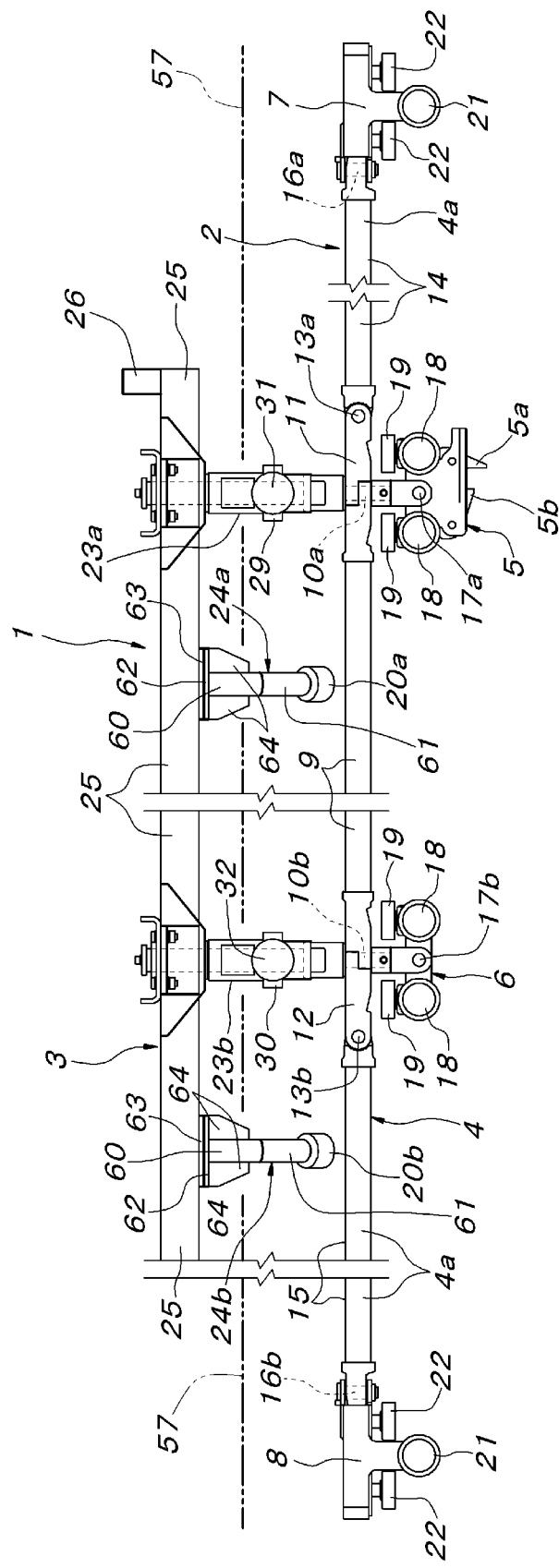
FIG. 3 is a partially cut-away side view of the conveying traveling body.

Here, a more detailed description is given. As shown in FIG. 3 and FIG. 4B, the driven roller support members 24a and 24b are each configured by a vertical upper column 60 and a lower arm 61 inclined obliquely sideways and downward from a lower end of the upper column 60. The driven rollers 20a and 20b are each pivotally supported at a distal end of the lower arm 61 in such a direction that a rotation axis center thereof is aligned with the length direction of the lower arm 61. An attaching plate 62 having been attached to an upper end of the upper column 60 is attached by bolts and nuts to an attaching seat 63 having been fixed on the downside of the longitudinal member 25 of the conveyed object support base 3. A pair of front and rear vertical reinforcing plates 64 are fixed parallel to the longitudinal member 25 at both front and rear inner corners between the upper column 60 and the attaching plate 62.

Figure 4A:
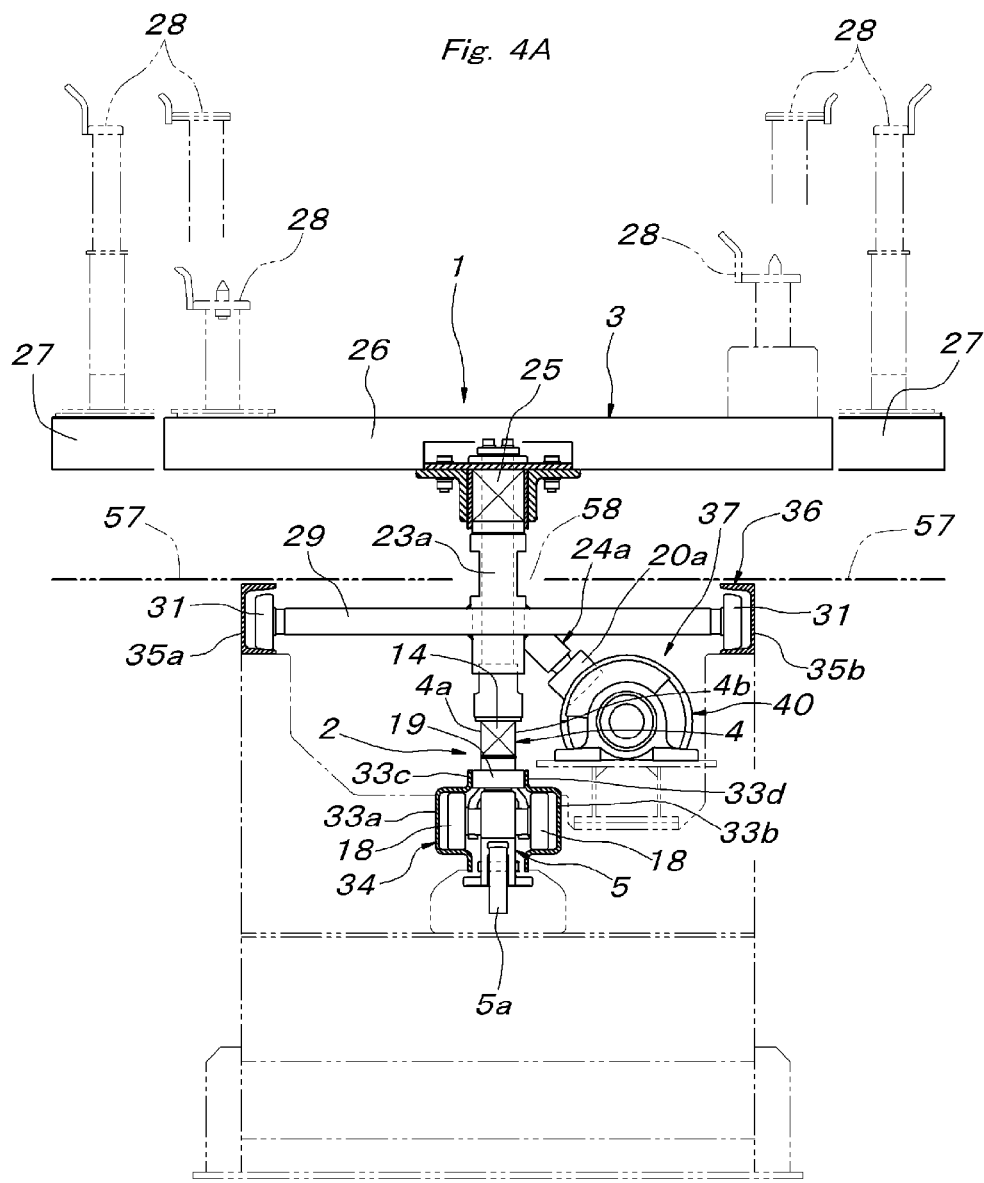
FIG. 4A is a longitudinal sectional front view of the entire conveying apparatus in the screw drive section.
Figure 4B:
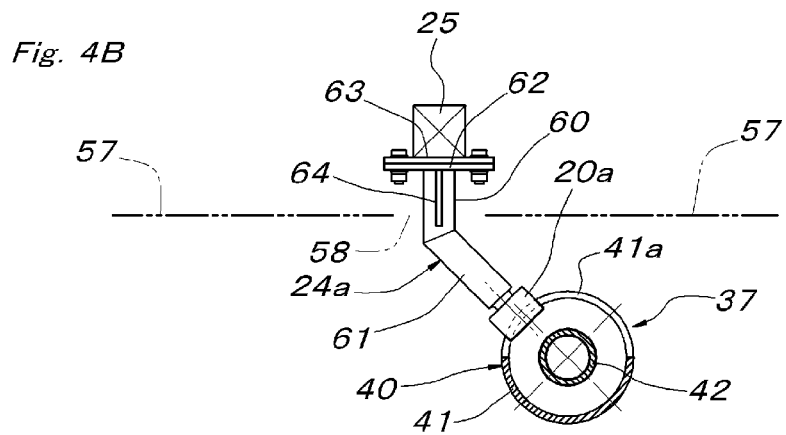
FIG. 4B is a longitudinal sectional front view of a main part of the above.

When the conveying traveling body 1 is viewed from the front, the driven roller support member 24a (24b) has its upper column 60 located in a vertical plane passing through the paired front and rear column members 23a and 23b, as shown in FIG. 4A. Thus, the upper column 60 overlaps with the paired front and rear column members 23a and 23b and cannot be seen. Only the lower arm 61 looks as if projecting obliquely downward from one of both lower left and right inner corners between the column member 23a (23b) and the arm member 29 (30). The driven roller 20a or 20b pivotally supported at the distal end of the lower arm 61 in the aforedescribed direction is configured to be positioned higher than the load bar 4, as can be seen in FIG. 4.

On the traveling path of the above-configured conveying traveling body 1, a supporting guide rail 34 composed of a pair of left and right mutually facing channel rail members 33a and 33b is installed. The left and right mutually facing channel rail members 33a and 33b rollably support respective supporting wheels 18 and 21 of the load trolleys 5 and 6 of the main body 2 and the guide trolleys 7 and 8 at both ends of the load bar 4. Further, the paired left and right mutually facing channel rail members 33a and 33b of the supporting guide rail 34 are provided with anti-sway rails 33c and 33d sandwiching respective anti-sway rollers 19 and 22 of the load trolleys 5 and 6 and the guide trolleys 7 and 8 from both lateral sides. In addition, an anti-sway guide rail 36 composed of a pair of left and right mutually facing channel rail members 35a and 35b is installed at least at a conveying path section in the traveling path of the conveying traveling body 1 where an object to be conveyed W is conveyed while supported on the conveyed object support base 3. To the pair of left and right mutually facing channel rail members 35a and 35b, the anti-sway guide rollers 31 and 32 provided to the paired front and rear column members 23a and 23b of the conveyed object support base 3 are individually rollably fitted.

Figure 2:
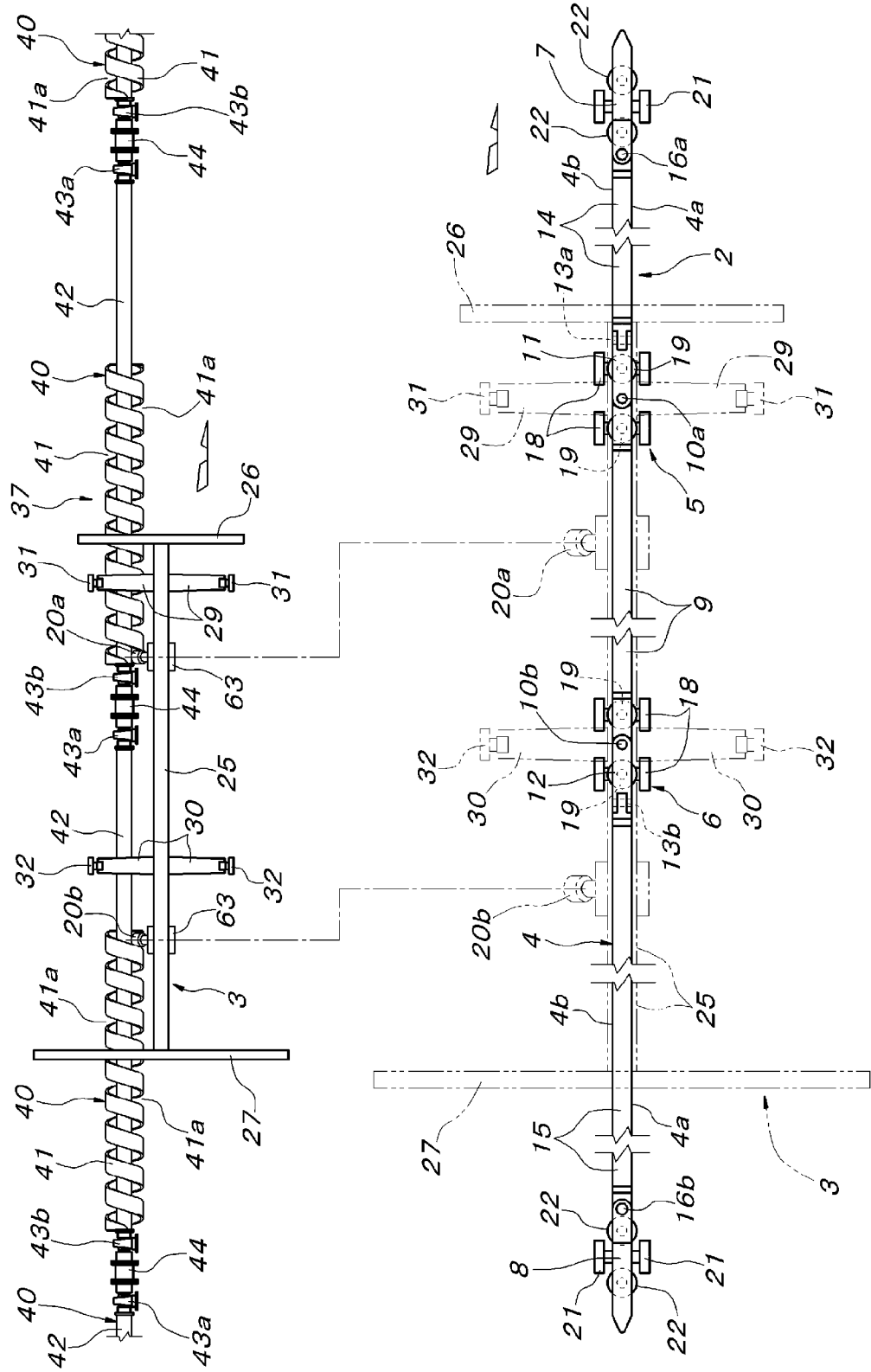
FIG. 2 is a plan view showing a screw shaft and a driven roller of the conveying apparatus of FIG. 1 and a plan view showing a main body of a conveying traveling body.
Figure 5:
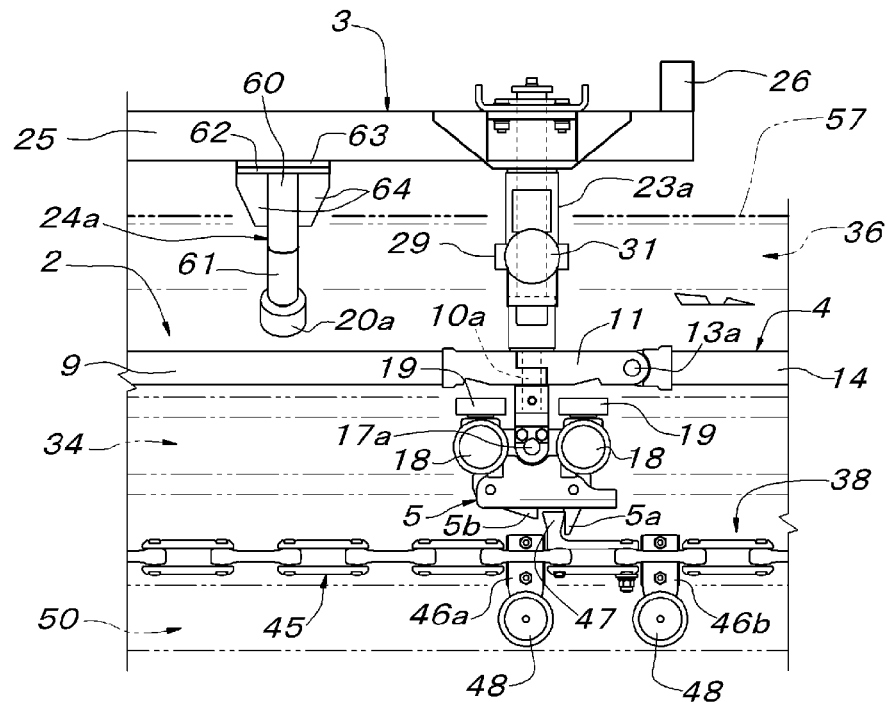
FIG. 5 is a side view of the main part of the conveying apparatus in a chain drive section.
Figure 6:
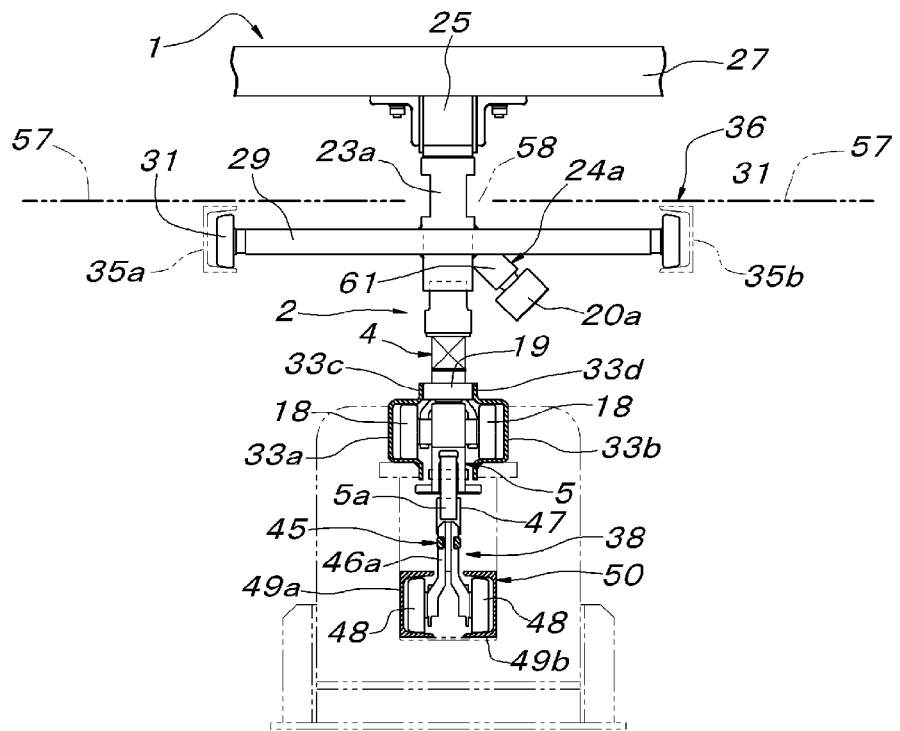
FIG. 6 is a front view of FIG. 5.
Figure 7:
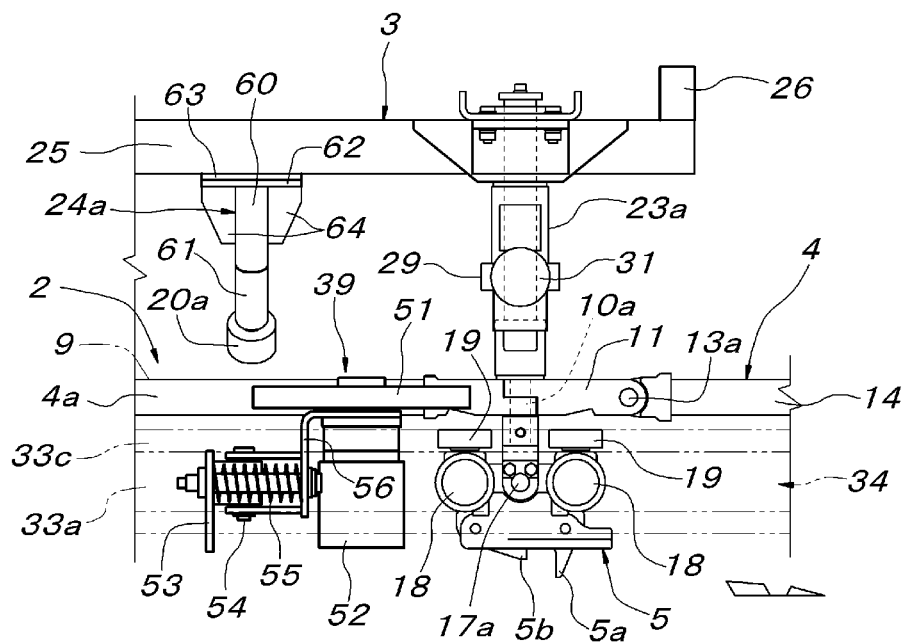
FIG. 7 is a side view of the main part of the conveying apparatus in a friction drive section.
Figure 8:
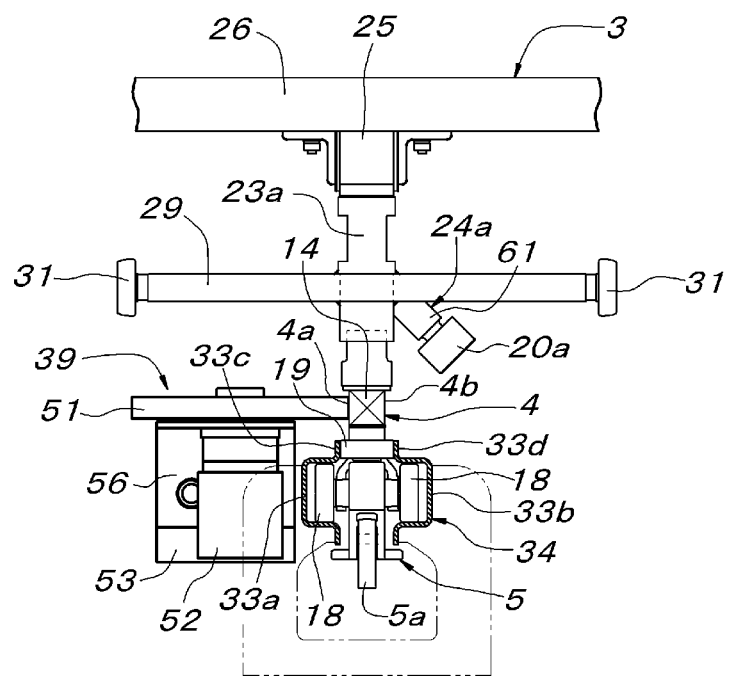
FIG. 8 is a longitudinal sectional front view of the above main part of the conveying apparatus.
Figure 9:
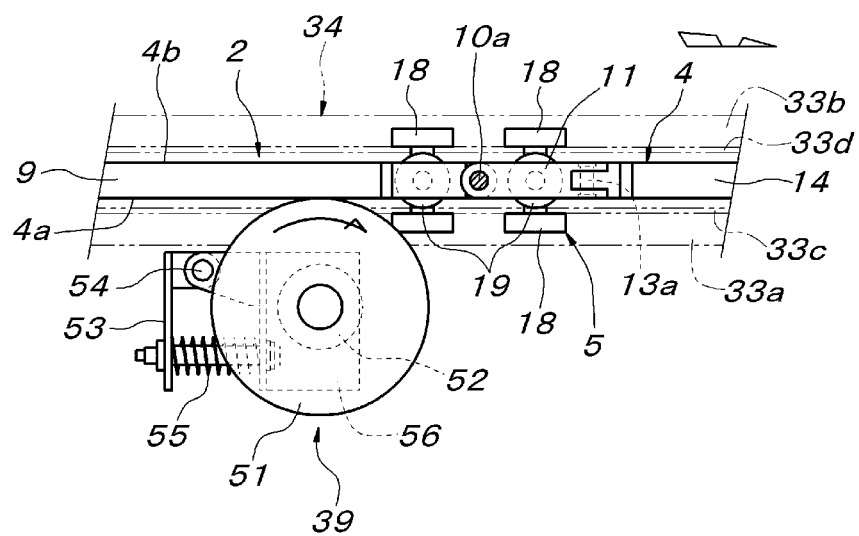
FIG. 9 is a plan view of the above main part of the conveying apparatus.

The traveling path of the conveying traveling body 1 is formed into an endless circulating traveling path by combining the screw drive section of driving the conveying traveling body 1 to travel by the screw shaft 37 as shown in FIGS. 1, 2, and 4, the chain drive section of driving the conveying traveling body 1 to travel by the pusher equipped chain conveyor 38 as shown in FIG. 5 and FIG. 6, and the friction drive section of driving the conveying traveling body 1 to travel by the friction drive means 39 as shown in FIGS. 7 to 9. The conveying traveling body 1 is configured to circulatingly travel at traveling speeds set for respective drive sections.

The screw shaft 37 constituting the screw drive section is formed by coupling a necessary number of screw shaft units 40 concentrically and linearly. Each screw shaft unit 40 is formed in such a manner that a strip plate is wound in a spiral fashion into a spiral body 41 and the spiral body 41 is fitted outside a shaft body 42 having a predetermined length and then fixed concentrically. A spiral groove 41a is formed between adjacent lateral sides of the spiral body 41. The shaft body 42 of each screw shaft unit 40 has both ends supported by respective bearings 43a and 43b concentrically. Shaft bodies 42 of adjacent screw shaft units 40 are interlocked together between the bearings 43a and 43b by a shaft joint 44. The screw shaft 37 thus configured is supported along the traveling path of the conveying traveling body 1 so that the driven rollers 20a and 20b on the conveying traveling body 1 side are fitted to the spiral groove 41a of the spiral body 41. An entire length of the spiral body 41 of each screw shaft unit 40 is shorter than that of the shaft body 42. The spiral bodies 41 are arranged in line while evenly spaced at an interval of space provided with no screws and having substantially the same length as the entire length of each spiral body 41. The length of each spiral body 41 and length of the space without screws between respective spiral bodies 41 in the screw shaft 37 are substantially equal to the distance between the paired front and rear driven rollers 20a and 20b on the conveying traveling body 1 side. As a matter of course, the screw shaft 37 is interlocked with a driving motor at one end or at an intermediate position thereof and rotationally driven in a predetermined direction at a predetermined circumferential speed although not shown.

According to the screw drive section as configured above, the spiral body 41 gives advance direction thrust to the conveyed object support base 3 of the conveying traveling body 1 via the front driven roller 20a of the conveying traveling body 1 by rotation of the screw shaft 37 while the driven roller 20a is fitted to the spiral groove 41a of the spiral body 41. As a result, the conveying traveling body 1 is guided by the supporting guide rail 34 and the anti-sway guide rail 36 and travels forward at a predetermined speed. When the front driven roller 20a is sent out of a front end of one spiral groove 41a of one spiral body 41, the rear driven roller 20b is drawn into a rear end of the spiral groove 41a of that spiral body 41 at the same time. When the rear driven roller 20b is sent out of the front end of the spiral groove 41a of that spiral body 41, the front driven roller 20a having moved within the space provided with no screws interposed with the next spiral body 41 is drawn into a rear end of a spiral groove 41a of the next spiral body 41 at the same time. In this manner, the conveying traveling body 1 continuously travels forward without stopping in the screw drive section.

At this time, where the screw shaft 37 supported in the screw drive section is configured as described above, the paired front and rear driven rollers 20a and 20b on the conveying traveling body 1 side are not fitted simultaneously across spiral grooves 41a of two spiral bodies 41 adjacent in the traveling direction. Thus, screw shaft units 40 whose spiral grooves 41a have different pitches, that is, screw shaft units 40 different in feeding speed are combined, thereby allowing the traveling speed of the conveying traveling body 1 within one screw drive section to be changed. It is noted that the entire length of the spiral body 41 constituting the screw shaft unit 40 may be configured longer than the distance between the paired front and rear driven rollers 20a and 20b of the conveying traveling body 1 and the paired front and rear driven rollers 20a and 20b may be configured to receive thrust simultaneously from one spiral body 41. When the traveling speed of the conveying traveling body 1 does not need to be changed within one screw drive section, the paired front and rear driven rollers 20a and 20b can also be configured to stride over two front and rear spiral bodies 41 adjacent in the traveling direction and receive thrust simultaneously from the front and rear spiral bodies 41. Furthermore, at this time where the entire length of one screw drive section is relatively short and can be constituted by a single continuous spiral body 41, one driven roller can be provided to one unit of the conveying traveling body 1.

When the conveying traveling body 1 is viewed from the front, the screw shaft 37 is supported within one of the spaces of both lower left and right inner corners between the column members 23a and 23b and the arm members 29 and 30 while placed in proximity to the arm members 29 and 30 and the load bar 4, as shown in FIG. 4A. At this moment, the screw shaft 37 can be arranged in such a manner that an axial center extension line of the driven roller 20a or 20b on the conveying traveling body 1 side does not intersect with the axial center of the screw shaft 37 but is slightly displaced toward the rotation direction side of the screw shaft 37 with respect to the axial center of the screw shaft 37. Configured in this manner, a line contact position between one of both lateral sides of the spiral groove 41a which pushes the driven roller 20a or 20b and a circumferential surface of the driven roller 20a or 20b can be made to align with the axial center of the screw shaft 37 when viewed from the axial center direction of the driven roller 20a or 20b. This can reduce friction between the circumferential surface of the driven roller 20a or 20b and the lateral side of the spiral groove 41a of the screw shaft 37 since the moving direction of the lateral side linearly contacted with the circumferential surface becomes parallel to the circumferential direction of the driven roller 20a or 20b, which further prevents abrasion of the lateral side of the spiral groove 41a of the screw shaft 37 and the circumferential surface of the driven roller 20a or 20b.

The pusher equipped chain conveyor 38 constituting the chain drive section in the traveling path of the conveying traveling body 1 is composed of a conveyor chain 45 and a guide rail 50 as shown in FIG. 5 and FIG. 6, which is already known. The conveyor chain 45 is composed of a chain main body formed by coupling a center link and a pair of upper and lower side links by vertical pins, and a pair of front and rear trolleys 46a and 46b attached to a pair of front and rear center links positioned at appropriate intervals in the length direction of the chain main body, so as to move at least a horizontal curve of the path. A pusher 47 is projected from an upper link between the paired front and rear trolleys 46a and 46b. The guide rail 50 is composed of a pair of left and right mutually facing channel rails 49a and 49b supporting and guiding a pair of left and right supporting rollers 48 pivotally supported at lower ends of the trolleys 46a and 46b by horizontal spindles. On the downside of the front load trolley 5 of the main body 2 of the conveying traveling body 1, a front engaged member 5a pushed by the pusher 47 and an anti-back dog 5b positioned at the rear of the pusher 47 and preventing the front load trolley 5 from moving rearward away from the pusher 47 are provided. The engaged member 5a and the anti-back dog 5b are already known and pivotally supported so as to only swing and fall toward the counterpart side from an active posture of sandwiching the pusher 47 from the front and the rear as shown in FIG. 5. The pusher 47 approaching from the rearward can cause the anti-back dog 5b to fall once and then enter between the anti-back dog 5b and the engaged member 5a.

The conveyor chain 45 is supported by the guide rail 50 so as for the pusher 47 to linearly move at positions directly below the load trolleys 5 and 6 on the conveying traveling body 1 side in the chain drive section. The conveyor chain 45 is stretched between a motor-driven driving gear and a free rotating gear as already known, and is driven so that the pusher 47 moves in a predetermined direction at a set speed. The engaged member 5a of the front load trolley 5 of the conveying traveling body 1 having been sent into the chain drive section is pushed to be driven by the pusher 47 having been fitted automatically between the engaged member 5a and the rear anti-back dog 5b from rearward, whereby the conveying traveling body 1 travels forward at the same speed as the conveyor chain 45. Further, at the terminal end of the chain drive section, the pusher 47 rotates laterally at a horizontal curve of the conveyor chain 45 and automatically leaves from between the engaged member 5a and rear anti-back dog 5b on the conveying traveling body 1 side, whereupon the conveying traveling body 1 stops at a substantially fixed position. The conveying traveling body 1 having stopped once can be sent out of the chain conveyor drive section by configuring such that a second engaged member projectingly provided on the downside of the rear load trolley 6 is pushed to be driven by a following pusher 47.

A friction drive means 39 in a friction drive section includes a friction drive wheel 51 pressure-contacting with one of the friction drive surfaces 4a and 4b at both lateral sides of the load bar 4 constituting the main body 2 of the conveying traveling body 1, for example, the friction drive surface 4a, and a driving motor 52 to rotationally drive the friction drive wheel 51, as shown in FIGS. 7 to 9. The friction drive wheel 51 and the driving motor 52 are pivotally supported horizontally swingably about a vertical spindle 54 with respect to a fixed frame 53 and also supported by a movable frame 56 biased in a direction of approaching the friction drive surface 4a of the load bar 4 by a compression coil spring 55 interposed with the fixed frame 53, wherewith the friction drive wheel 51 pressure-contacts with the friction drive surface 4a of the load bar 4. The friction drive means can be one that includes a back-up roller which sandwiches the load bar 4 with the friction drive wheel 51.

The above friction drive means 39 is arranged at appropriate intervals in the traveling path direction within the friction drive section. As already known, the friction drive means 39 can be arranged at only an entrance and an exit of the friction drive section and a plurality of conveying traveling bodies 1 can be driven to travel at a fixed speed while butting each other, in the friction drive section. Alternatively, the friction drive means 39 can be arranged at uniform intervals slightly shorter than the entire length of the load bar 4 and the conveying traveling bodies 1 can be driven to travel at a fixed speed while space is kept at fixed intervals.

It is noted that the screw drive section, the chain drive section, and the friction drive section can be arranged in combination in any order as appropriate to constitute the circulating traveling path of the conveying traveling body 1. However, a suitable feeding means can be used together if the conveying traveling body 1 having been sent out of an upstream drive section cannot be taken over smoothly and reliably by a driving means of a downstream drive section (such as the screw shaft 37, the pusher equipped chain conveyor 38, or the friction drive means 39) or needs to be taken over by the driving means of the downstream drive section at a predetermined timing.

Further, the friction drive section where the conveying traveling body 1 is frictionally driven by the friction drive means 39 by means of the load bar 4 is not essential in the conveying apparatus of the present invention. However, the driven rollers 20a and 20b used in the screw drive section are arranged higher than the lateral position of the load bar 4, so that the friction drive section where the conveying traveling body 1 is frictionally driven by the friction drive means 39 by means of the load bar 4 can be combined as in the aforedescribed embodiment. Further, the driven roller support member with the lower end at which the driven roller 20a or 20b used in the screw drive section is pivotally supported is not projected downward from a position laterally away from the center line of the conveyed object support base 3. Thus, as shown in each drawing, the following configurations are possible; the floor member 57 is laid between the main body 2 of the conveying traveling body 1 and the conveyed object support base 3 at a height higher than the anti-sway guide rollers 31 and 32, and the column members 23 and 24 coupling the main body 2 of the conveying traveling body 1 and the conveyed object support base 3 and the upper columns 60 of the driven roller support members 24a and 24b move while vertically penetrating a slit opening 58 formed in the floor member 57 along the traveling path of the conveying traveling body 1, wherewith the main body 2 of the conveying traveling body 1 travels within the underfloor space and the conveyed object support base 3 travels within the work space above the floor.

Industrial Applicability

The conveying apparatus with use of the conveying traveling body of the present invention can be utilized, for example, in painting and drying lines for automobile vehicle bodies by suitably combining a screw drive section capable of changing a conveying pitch, a chain drive section superior in heat resistance, and a friction drive section suitable for high speed traveling and driving.

What is claimed is:

1. A conveying apparatus with a conveying traveling body having a driven roller engageable with a screw shaft supported along a screw drive section of a traveling path and having an engaged member engageable with a pusher of a pusher equipped chain conveyor stretched along a chain drive section of the traveling path, the conveying traveling body comprising:
   front and rear trolleys;
   a load bar coupling the front and rear trolleys together;
   a front vertical column supported by the front trolley and a rear vertical column supported by the rear trolley;
   a conveyed object support base supported by the front and rear vertical columns,
   the engaged member projecting on a downside of at least one of the front and rear trolleys;
   the conveyed object support base being provided with a driven roller support member having an upper column projected downward and aligned in a vertical plane passing through the front and rear vertical columns and a lower arm extending laterally from a lower end of the upper column; and the driven roller is pivotally supported by the lower arm of the driven roller support member and is positioned higher than the load bar.

2. The conveying apparatus according to claim 1, wherein the lower arm of the driven roller support member is inclined in an oblique downward direction from the upper column, and the driven roller is pivotally supported in such a manner that an axial center thereof is inclined in parallel with the oblique downward direction of the lower arm.

3. The conveying apparatus according to claim 1, wherein the driven roller support member having the lower arm pivotally supporting the driven roller is provided in a front and rear pair aligned in a vertical plane passing through the front and rear vertical columns.

4. The conveying apparatus according to claim 1, wherein the front and rear vertical columns and the upper column of the driven roller support member are configured to move while vertically penetrating a slit opening provided in a floor member installed in such a manner as to vertically separate between a space where the conveyed object support base travels and a space where the trolleys and the load bar move.

* * * * *